US012070865B2

United States Patent
Abadi et al.

(10) Patent No.: US 12,070,865 B2
(45) Date of Patent: Aug. 27, 2024

(54) DEVICE AND METHOD FOR USE IN CLEANING A FACADE

(71) Applicant: Skyline Robotics Ltd., Tel Aviv (IL)

(72) Inventors: Avi Abadi, Holon (IL); Yaron Schwarcz, Tel-Aviv (IL)

(73) Assignee: Skyline Robotics Ltd., Tel Aviv (IL)

( * ) Notice: Subject to any disclaimer, the term of this patent is extended or adjusted under 35 U.S.C. 154(b) by 726 days.

(21) Appl. No.: 16/967,830

(22) PCT Filed: Feb. 7, 2019

(86) PCT No.: PCT/IL2019/050157
§ 371 (c)(1),
(2) Date: Aug. 6, 2020

(87) PCT Pub. No.: WO2019/155473
PCT Pub. Date: Aug. 15, 2019

(65) Prior Publication Data
US 2021/0040757 A1   Feb. 11, 2021

Related U.S. Application Data

(60) Provisional application No. 62/627,785, filed on Feb. 8, 2018.

(51) Int. Cl.
*B25J 9/16* (2006.01)
*A47L 1/02* (2006.01)
*B25J 11/00* (2006.01)

(52) U.S. Cl.
CPC ......... *B25J 9/1664* (2013.01); *B25J 11/0085* (2013.01); *A47L 1/02* (2013.01); *G05B 2219/39371* (2013.01)

(58) Field of Classification Search
CPC ........ B25J 9/1664; B25J 5/00; B25J 11/0075; B25J 11/0085; G05B 2219/39371;
(Continued)

(56) References Cited

U.S. PATENT DOCUMENTS

| 4,993,913 A * | 2/1991 | Ohtsuki .............. E04G 5/04 |
| | | 901/41 |
| 9,020,637 B2 | 4/2015 | Schnittman |
| 9,119,516 B2 | 9/2015 | Mayer et al. |
| 2006/0048800 A1 * | 3/2006 | Rast ................. B08B 3/04 |
| | | 134/172 |

(Continued)

FOREIGN PATENT DOCUMENTS

| CA | 2637956 | 8/2008 |
| CN | 203626207 | 6/2014 |

(Continued)

OTHER PUBLICATIONS

Davidson et al., "MonoSLAM: Real-Time Single Camera SLAM," Apr. 23, 2007, IEEE Transactions on Pattern Analysis and Machine Intelligence, vol. 29, Issue: 6 (Year: 2007).*

(Continued)

*Primary Examiner* — Spencer D Patton

(57) ABSTRACT

Disclosed is a method for controlling cleaning at least a portion of a building facade (104*a*). A multi-dimensional map of a facade (104*a*) is cleaned from an elevator platform (200) of an elevator system is received. According to the map, an ordered sequence of instructions is determined. The instructions comprise robotic arm instructions and elevator platform instructions that are temporally intertwined to execute a cleaning pattern covering at least part of facade (104*a*). The robotic arm instructions are forwarded to control one or more robotic arms (206) and the elevator platform instructions are forwarded to control the elevation of the elevator platform (200). A corresponding device (221, 213) and non-transient memory (223), and a system having the device, are also disclosed.

20 Claims, 9 Drawing Sheets

(58) Field of Classification Search
CPC . G05B 2219/45078; G05D 2201/0203; G05D 2105/10; G05D 2105/89; G05D 2107/90; Y10S 180/901; E04G 3/30; E04G 3/32; A47L 1/00; A47L 1/02
See application file for complete search history.

(56) References Cited

U.S. PATENT DOCUMENTS

| | | | |
|---|---|---|---|
| 2013/0292229 A1* | 11/2013 | Davi | B60P 3/14 |
| | | | 198/465.1 |
| 2014/0109932 A1* | 4/2014 | Lange | A47L 1/02 |
| | | | 134/6 |
| 2015/0117975 A1* | 4/2015 | Wright | B60P 7/0846 |
| | | | 410/103 |
| 2016/0121486 A1 | 5/2016 | Lipinski et al. | |
| 2017/0164797 A1 | 6/2017 | Abramson et al. | |
| 2017/0284113 A1* | 10/2017 | Lim | B25J 5/04 |
| 2018/0355628 A1* | 12/2018 | Lin | E04G 23/002 |

FOREIGN PATENT DOCUMENTS

| | | |
|---|---|---|
| CN | 104825103 | 8/2015 |
| CN | 108472674 | 7/2021 |
| JP | H02-30476 | 1/1990 |
| JP | 2009-524503 | 7/2009 |
| JP | 2019-517829 | 6/2019 |
| JP | 2022-101566 | 7/2022 |
| KR | 10-2018-0136438 | 12/2018 |
| WO | WO 2007/087598 | 8/2007 |
| WO | WO 2017/171644 | 10/2017 |
| WO | WO 2019/155473 | 8/2019 |

OTHER PUBLICATIONS

Leidner et al., "Object-Centered Hybrid Reasoning for Whole-Body Mobile Manipulation," 2014, IEEE International Conference on Robotics & Automation (ICRA), pp. 1828-1835 (Year: 2014).*

Rollin' Justin, "Institue of Robotics and Mechatronics: Rollin' Justin," accessed Feb. 7, 2018, https://www.dlr.de/rm/en/desktopdefault.aspx/tabid-11427 (Year: 2018).*

Definition of 'crane', accessed Feb. 2, 2024, Collins English Dictionary, https://www.collinsdictionary.com/us/dictionary/english/crane (Year: 2024).*

Definition of 'integral', accessed Feb. 2, 2024, Collins English Dictionary, https://www.collinsdictionary.com/us/dictionary/english/integral (Year: 2024).*

"Forward, V., Sense 3.a." Oxford English Dictionary, Oxford UP, Sep. 2023, https://doi.org/10.1093/OED/6440852755. (Year: 2023).*

Notice of Reason(s) for Rejection Dated Jan. 17, 2023 From the Japan Patent Office Re. Application No. 2020-565037 and Its Translation Into English. (10 Pages).

International Preliminary Report on Patentability Dated Aug. 20, 2020 From the International Bureau of WIPO Re. Application No. PCT/IL2019/050157. (7 Pages).

International Search Report and the Written Opinion Dated May 20, 2019 From the International Searching Authority Re. Application No. PCT/IL2019/050157. (10 Pages).

Supplementary European Search Report and the European Search Opinion Dated Dec. 20, 2021 From the European Patent Office Re. Application No. 19750548.0. (12 Pages).

Leidner et al. "Object Centered Hybrid Reasoning for Whole-Body Mobile Manipulation", EEE International Conference on Robolics & Automation (ICRA): 1828-1835, XP32650830A, May 31-Jun. 7, 2014.

Schraft et al. "Automated Cleaning of Windows on Standard Facades", Automation in Construction, 9(5-6):489-501, XP4208191A, Sep. 2000.

Examinatin Report Dated Nov. 2, 2022 From the Intellectual Property Office of Singapore, IPOS Re. Application No. 11202007483T. (4 pages).

Search Report and Written Opinion Dated Jun. 28, 2021 From the Intellectual Property Office of Singapore, IPOS Re. Application No. 11202007483T. (9 Pages).

Office Action Dated Jun. 28, 2023 From the Israel Patent Office Re. Application No. 276586. (4 Pages).

* cited by examiner

DEVICE AND METHOD FOR USE IN CLEANING A FACADE

RELATED APPLICATION/S

This application is a National Phase of PCT Patent Application No. PCT/IL2019/050157 having International filing date of Feb. 7, 2019, which claims the benefit of priority under 35 USC § 119(e) of U.S. Provisional Patent Application No. 62/627,785 filed on Feb. 8, 2018. The contents of the above applications are all incorporated by reference as if fully set forth herein in their entirety.

FIELD AND BACKGROUND OF THE INVENTION

The present invention, in some embodiments thereof, relates to a method, device, system and/or non-transient memory for use in controlling cleaning a building facade.

Robots may be used to clean facades of buildings. Such systems may be mounted to an elevator frame that is supported by a crane. In some cleaning system, a robotic machine is operated by a person manually. In other systems a specific robot is designed for a specific building, at a cost of in the millions of dollars and is not readily adaptable for use with other buildings.

In some systems a robot executes a cleaning routine and the crane changes the elevation of the frame so the robot can execute the cleaning routine at other elevations. The robot's routine is pre-programmed to be customized to the design of the building that it is intended to clean. Likewise the crane is configured to operate to a pre-programmed routine that is customized to the building, e.g. based on known window sizes and spacings. Thus the robot, as configured for the building, cannot be applied to differently designed building. Further any dynamic changes in the configuration of the building facade, e.g. an opening of a window, cannot be accounted for by the crane or robot.

Thus there exists a need for a new way to clean a building facade.

SUMMARY OF THE INVENTION

A first aspect of the present invention provides a computer implemented method for controlling cleaning of a building facade from an elevator platform of an elevator system. The method comprises receiving a multi-dimensional map of at least a portion of at least one facade of a building; and determining, according to the multi-dimensional map, an ordered sequence of instructions. The ordered sequence of instructions comprises robotic arm instructions for controlling at least one robotic arm of a robotic system on the elevator platform, and elevator platform instructions for controlling a position of the elevator platform. The robotic arm instructions and the elevator platform instructions are temporally intertwined to execute a cleaning pattern covering at least part of the at least one façade. The method further comprises forwarding the robotic arm instructions to control the at least one robotic arm of the robotic system via at least one first interface and the elevator platform instructions to control the elevation of the elevator platform via a second interface. The second interface is different from the at least one first interface.

In some embodiments, according to the cleaning pattern, a cleaning tool at a distal end of each of the at least one robotic arms follows a vector that traces the cleaning pattern. In some embodiments, determining the ordered sequence of instructions comprises calculating the robotic arm instructions based on the multi-dimensional map, a determined current position of the cleaning tool, and a determined elevation of the elevator platform.

Additionally or alternatively, in some embodiments, the method comprises determining a path planned for the elevator platform based on a selection of surfaces to be cleaned; and determining the elevator platform instructions based on said path. The path includes at least one of: (a) one or more movements in elevation; and (b) one or more horizontal movements. The second interface is a communication interface to a control system that is integral to a crane. The control system determines the position of the elevator platform based on said elevator platform instructions.

Additionally or alternatively, in some embodiments, the at least one first interface is a communication interface to a control system that is integral to the robotic system.

Additionally or alternatively, in some embodiments, the method comprises dynamically updating the multi-dimensional map to represent a current configuration of the facade.

Additionally or alternatively, in some embodiments, the method comprises updating at least part of the multi-dimensional map during a time period in which the ordered sequence of instructions is determined.

Additionally or alternatively, in some embodiments, the method comprises updating the multi-dimensional map using sensor data derived from at least one sensor supported on the elevator platform. In some embodiments, the at least one sensor comprises at least one camera wherein the method comprises performing mono simultaneous localization and mapping (mono-SLAM) for each of the at least sensors.

Additionally or alternatively, in some embodiments, the method comprises updating the multi-dimensional map from correlated sensor data from a plurality of multi-dimensional measurements recorded from different perspectives.

Additionally or alternatively, in some embodiments, different parts of the robotic arm instructions control different robotic arms.

Additionally or alternatively, in some embodiments, the robotic arm instructions configure the different robotic arms for operate simultaneously for a least part of a robotic arm instruction execution period.

Additionally or alternatively, in some embodiments, the method comprises determining a position of the robotic arm and updating the multi-dimensional map, using simultaneous localization and mapping. In some embodiments, the method comprises determining the robotic arm instructions based, in part on said determined position of the robotic arm.

Additionally or alternatively, in some embodiments, the method comprises receiving a plurality of selections of respective portions of an image that corresponds to the at least facade, and determining the ordered sequence of instructions based on said selections.

Additionally or alternatively, in some embodiments, the robotic arm instructions configure each of the at least one robotic arms to move with at least six degrees of freedom.

Additionally or alternatively, in some embodiments, the elevator platform instructions configure the elevator platform to move with at least three degrees of freedom.

Additionally or alternatively, in some embodiments, the method further comprises generating instructions for operating a reverse osmosis cleaning system configured for cleaning the at least one facade at a distal end of the at least one robotic arm.

Additionally or alternatively, in some embodiments, the multi-dimensional map is a three dimensional map.

Additionally or alternatively, in some embodiments, the method comprises measuring a contact force between the at least one robotic and the at least part of the at least one facade during execution of the cleaning pattern, wherein the robotic arm instructions are adapted for closed loop control of the contact force.

In some embodiments, the method more specifically comprises:

generating instructions for operating a reverse osmosis cleaning system configured for cleaning the at least one facade at a distal end of the at least one robotic arm; and measuring a contact force between the at least one robotic and the at least part of the at least one facade during execution of the cleaning pattern, wherein the robotic arm instructions are adapted for closed loop control of the contact force.

In a second aspect of the present invention there is provided a device for controlling cleaning of a building facade from an elevator platform of an elevator system. The device comprises at least one processor. The at least one processor is configured to receive a multi-dimensional map of at least a portion of at least one facade of a building; and determine, according to the multi-dimensional map, an ordered sequence of instructions. The ordered sequence of instructions comprise: robotic arm instructions for controlling at least one robotic arm of a robotic system on the elevator platform, and elevator platform instructions for controlling a position of the elevator platform. The robotic arm instructions and the elevator platform instructions are temporally intertwined to execute a cleaning pattern covering at least part of the at least one façade. The at least one processor is further configured to forward the robotic arm instructions to control the robotic arm of the robotic system via a first interface and the elevator platform instructions to control the elevation of the elevator platform via a second interface. The second interface is different from the first interface.

Each of the embodiments of the first aspect of the present invention may also apply to the second aspect of the present invention.

In a third aspect of the present invention there is provided a system/apparatus for cleaning a building facade. The system has the device of the second aspect of the present invention, and the at least one robotic arm. The system may include an interface for communicating between the at least one robotic arm and the device. In some embodiments the interface is a wireless interface.

In some embodiments, the at least one robotic arm is a robotic arm manipulator of a reverse osmosis cleaning system having a cleaning tool at a distal end of each of the at least robotic arms. In some embodiments, the cleaning tool is a brush.

In some embodiments, the at least one robotic arm comprises at least one force sensor configured for measuring a contact force between the at least one robotic arm and the at least part of the at least one facade during execution of the cleaning pattern. The robotic arm instructions are adapted for closed loop control of the contact force. In some embodiments, the at least one force sensor comprises a force sensor that measures force based on a displacement a cleaning tool with respect to a component on a distal end of a robotic arm of said at least one least robotic arms. The at least one force sensor may additionally or alternatively comprise at least one torque sensor in a respective joint of a robotic arm of said at least one least robotic arms.

The use of the reverse osmosis cleaning system may exist in some embodiments without the at least one force sensor, and the use of the at least one force sensor may exist in some embodiments without the use of the reverse osmosis cleaning system. However, in some embodiments of the invention, the system includes both the reverse osmosis cleaning system and the at least one force sensor.

Additionally or alternatively, in some embodiments, the system includes a mounting structure has a mounting frame. Each of the at least one robotic arms is mounted on the mounting frame and the mounting structure further a clamping assembly that extends, in an adjustable configuration, from mounting frame to adjusts a position of the mounting frame on the elevator platform to fix the mounting frame within the elevator platform. In some embodiments, the clamping assembly has an adjustable length.

Additionally or alternatively, the clamping assembly may mount to an adjustable position on a rail of the mounting frame. The rail may include a plurality of mounting features at different lengths along the rail to provide said adjustable position.

In some embodiments, the apparatus includes at least four of said clamping assemblies.

Optionally, the system is comprised of at least two assemblies that are physically separated from each other, wherein the device is in one of the assemblies and the at least one robotic arm is in another one of the assemblies. In some embodiments, whether physically separated or not, the assembly that includes the device is retrofitted to operate with the assembly that includes the at least one robotic arm. In other words the device may be configured to operate with a robotic arm that is already in operation.

In a fourth aspect of the present invention there is provided a non-transient computer readable medium instructions for execution of a program for controlling cleaning of a building facade from an elevator platform of an elevator system. Execution of the instructions by at least one processor configures the processor to receive a multi-dimensional map of at least a portion of at least one facade of a building; and determine, according to the multi-dimensional map, an ordered sequence of instructions. The ordered sequence of instructions comprises robotic arm instructions for controlling at least one robotic arm of a robotic system on the elevator platform, and elevator platform instructions for controlling a position of the elevator platform. The robotic arm instructions and the elevator platform instructions are temporally intertwined to execute a cleaning pattern covering at least part of the at least one facade. Execution of the instructions by at least one processor further configures the processor to forward the robotic arm instructions to control the robotic arm of the robotic system via a first interface and the elevator platform instructions to control the elevation of the elevator platform via a second interface. The second interface is different from the first interface.

Each of the embodiments of the first aspect of the present invention may also apply to the fourth aspect of the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, a processing system/component may be provided by hardware for performing selected tasks according to embodiments of the invention could be implemented as a chip or a circuit. The processing system/component may comprise one or more processors. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a processing system/component, such as a computing platform for executing a plurality of instructions. Optionally, the data processor includes a volatile memory for storing instructions and/or data and/or a non-volatile storage, for example, a magnetic or solid state hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

The present invention, in some embodiments thereof, relates to a method, device, system and/or non-transient memory for use in controlling cleaning a building facade.

Figure 1:
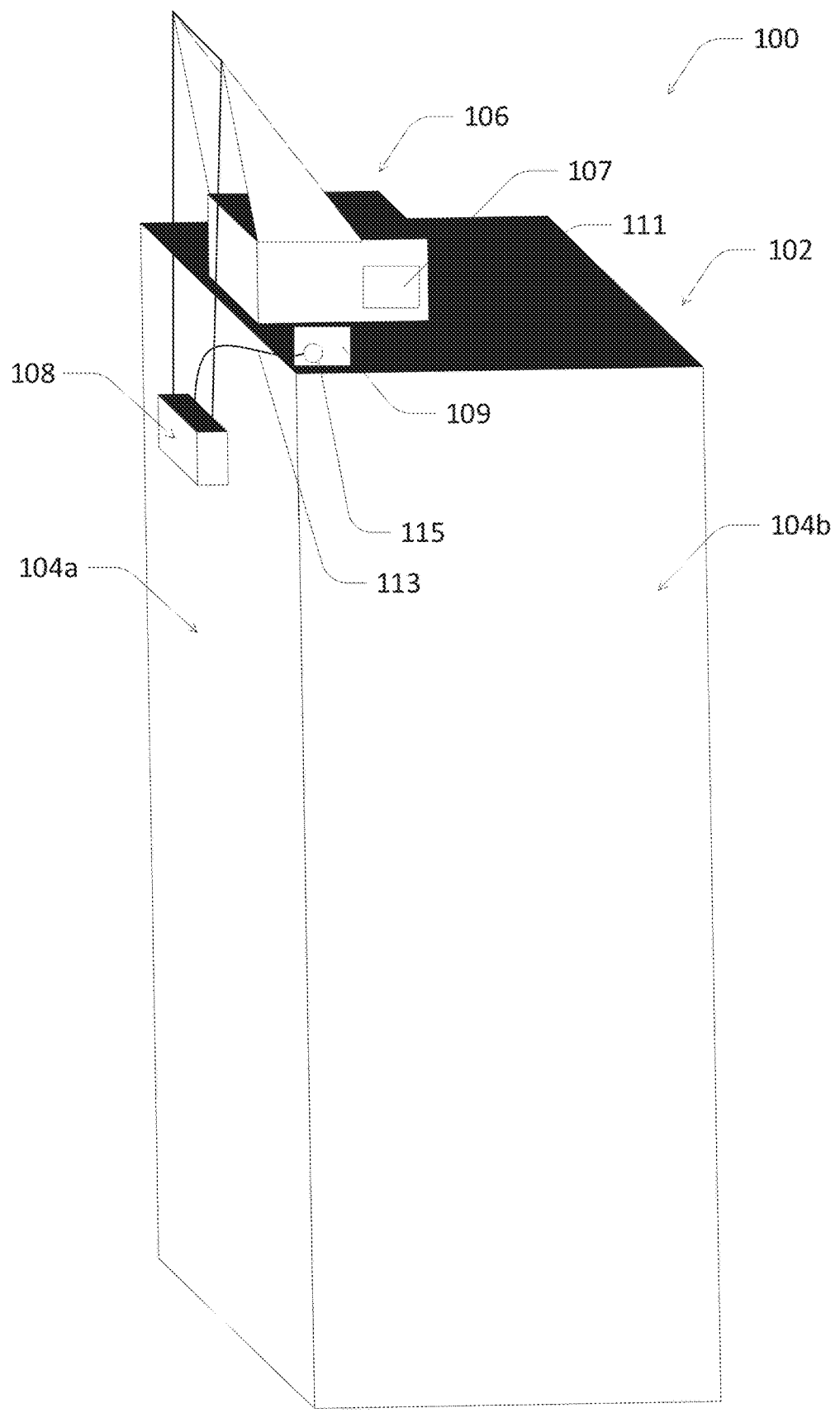
FIG. 1 is a conceptual drawing of a structure comprised of building serviced by building maintenance elevator on which one or more aspects of the present invention may be performed.

In general and non-limiting terms, in some exemplary embodiments of the present invention, a robotic arm(s) and an elevation of an elevator platform that supports a robotic system that includes the robotic arm(s) are automatically controlled, optionally in a closed loop, to provide a cleaning pattern that matches to a multi-dimensional map, optionally dynamically adapted, of the facade. The elevator platform is in some embodiments part of a building maintenance elevator supported on the building. The map is dynamically derived to account for changes in the facade, which may be caused for example, by opening of windows. The use of a map may be used to adapt the cleaning pattern/routine of the robotic arm(s) to different buildings, rather than having to manually re-customize operation of the robotic arm(s) and elevator to the relevant building. Further, in some embodiments the mapping is 3D mapping established by correlating 3D data derived from sensors on different 3D sensors, such as lidar systems or camera systems. The cameras are spaced from each other to perform their respective sensor measurements from different angles/perspectives, which may be different vertical and/or lateral angles. The use of measurements from these different angles may aid in the 3D mapping of reflective and/or transparent surfaces, by reducing the level of noise corresponding to such surfaces in the map. Localization and Mapping Simultaneously (SLAM) is used to dynamically update a pre-measured map an identify a position of the robotic arm(s) with respect to the map. This enables the movement of a tool at a distal end of the robotic system, e.g. due to winds acting on the elevator basket and/or the robotic system therein, and/or due to cleaning reaction forces on the cleaning tool, to be identified and controlled, relative to the facade. Using the new detected position of the cleaning tool and/or any changes to the map, a movement vector of the robotic arm is recalculated so that is tracks a pre-planned path that spans some or all of the scanned facade. Moreover, with the refreshed scan (live/dynamically derived scan) anomalies in the map can also be detected. Software may then ask an operator to mark, via a graphical user interface (GUI) on a handheld computing device (not shown), a window (or other part of the facade) to be cleaned on the refreshed map. In some embodiments, the operator decides which surfaces (e.g. windows) to clean by marking them on the map and decides to change the path tracked by the system, from the predefined path to some a new path. For example, the operator can see the 3D model of the building, via the GUI, with software-detected windows marked in the model. The operator can approve or edit the detected windows. In other embodiments, the detected windows are taken to be correct and no intervention by the operator is required. Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. Referring now to the drawings, FIG. 1 illustrates an exemplary structure 100 that includes a multi-level building 102 having a plurality of facades 104(a,b). A crane 106 is mounted atop the building 102 and supports a building maintenance elevator 108 from which an adjacent facade 104a may be cleaned. The crane includes a control system 107 which raises or lowers the building maintenance elevator 108 so that the different vertical locations (e.g. different levels/floors) of the building facade 104a may be cleaned. In some embodiments the building maintenance elevator may span the entire width of the facade, so the access to the whole of the facade may be gained by changing only the elevation of the building maintenance elevator 108. In other embodiments, such as illustrated in FIG. 1, the building maintenance elevator 108 may be substantially narrower than the facade 104a, and the crane 106 may thus also be configured to move the elevator laterally as well, so that the entire width of the facade may be accessed for cleaning. The control system 107 is integral to (attached to or part of) the crane, as opposed to the robot, and in some cases may be part of a machine that moves the elevator by actuating control buttons in/on the crane, e.g. a first button that raises the elevator, and a second button that lowers the elevator. The control system in some embodiments is a modified version of an existing control system that enables it to communicate with an external processor such as processing component 221 as will be described herein. In some embodiments, a Bluetooth transducer may be used to enable communication to the processing system 221. The control system can move the building maintenance elevator in at least a vertical direction, but in some embodiments, the control system 107 can control the position of the building maintenance elevator in at least three degrees of freedom: along two perpendicular lateral axes x and y; along a vertical axis z, and in some embodiment at least one further degree of freedom, which in some cases is a rotation around the vertical axis. In some embodiments, the elevator/basket has, more specifically, four degrees of freedom. In some embodiments, the basket is movable in at least one an additional degree of freedom, depending on the building's requirements.

The control system includes a communication interface that can receive instructions, by a wired or in some embodiments a wireless, communication from a remote device, such as a device in accordance with some embodiments of the present invention. In some cases, rather than actuating raising/lowering buttons, the control system 107 has an electronic or electromagnetic output to electromechanical interface that drives movement of the elevator, as commanded by the remote device (by a wired or in some embodiments, wireless, connection), via a communication interface on the control system.

Figure 2A:
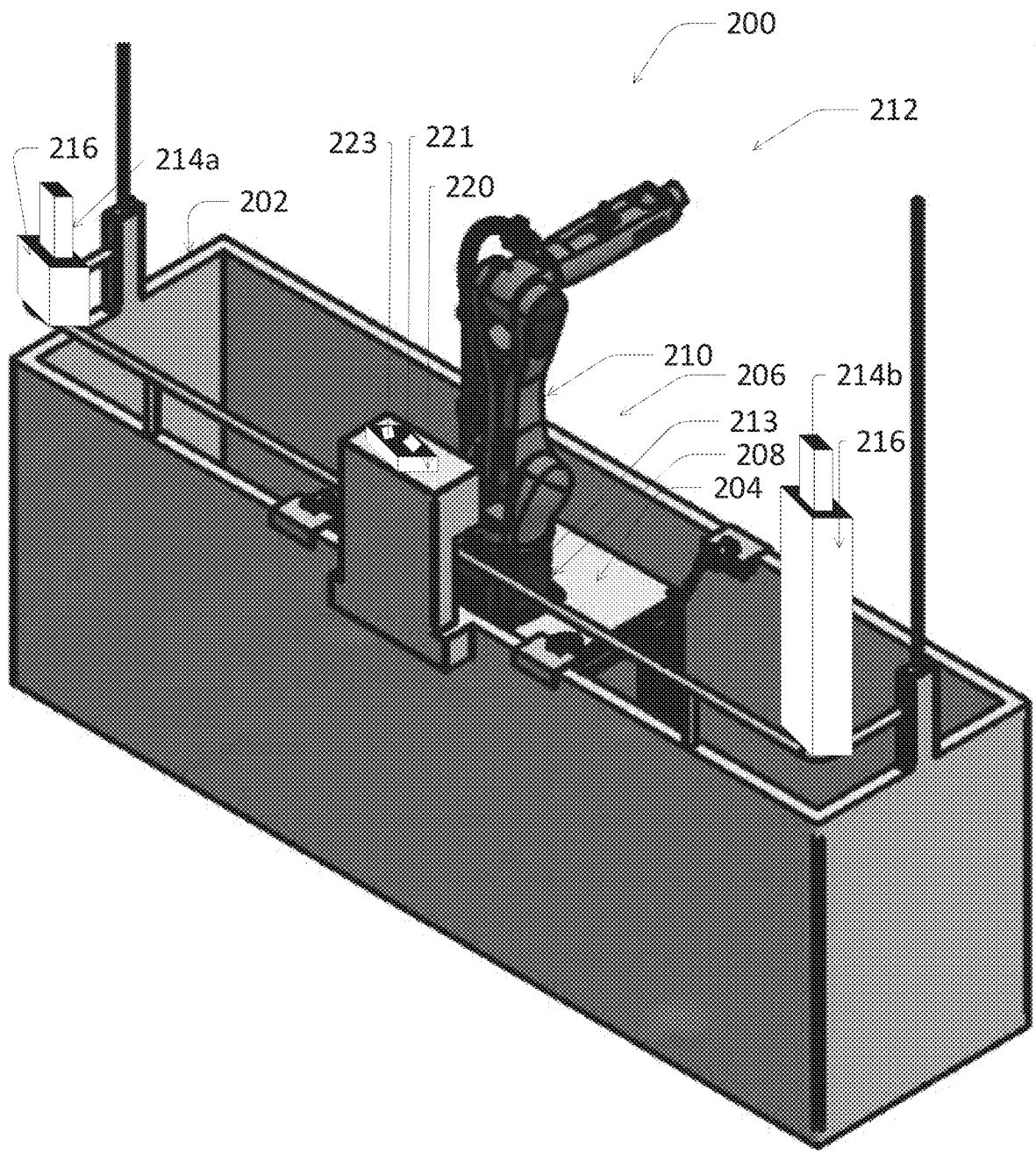
FIG. 2A is a perspective view of a building maintenance elevator in accordance with one or more aspects of the present invention.

FIG. 2A shows a close-up view of a building maintenance elevator 200, which in some embodiments is the same as building maintenance elevator 108. The elevator includes a basket 202, in the form of an open frame on a platform, and one or more mounting structures 204 for mounting a respective one or more robots 206 that make up a robotic system. The/each robot 206 has a base 208 mounted on the mounting structure 204 and a robotic arm 210 having a distal end 212 at which a cleaning tool assembly 250 (FIG. 2B) is held by the robotic arm to clean the adjacent facade 104a of the building 102. The robotic arm is a robotic arm manipulator in the sense of having numerous degrees of freedom for operating the cleaning tool of a reverse osmosis cleaning system. This provides an advantage over prior systems that operate similarly to a car wash system, having relatively limited reachability and versatility. Returning to FIG. 1, the reverse osmosis system 109 may optionally be posed in a fixed location with respect to the building 102 (e.g. on the roof 111) from which it provides water supply to the cleaning tool using a water pipe 113 with an automated rolling drum 115.

Figure 2B:
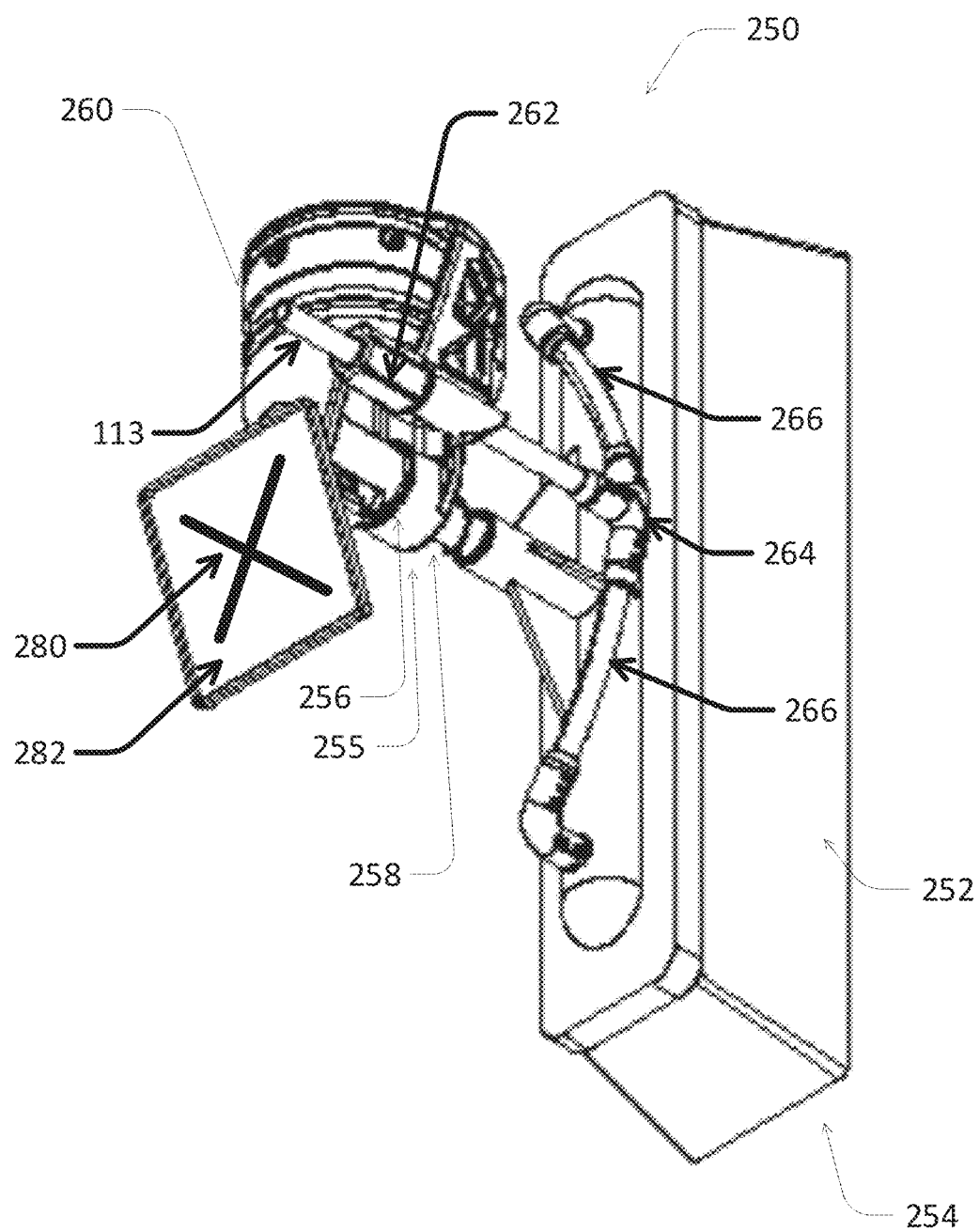
FIG. 2B is perspective view of a cleaning tool assembly used in some embodiments of the present invention.
Figure 2C:
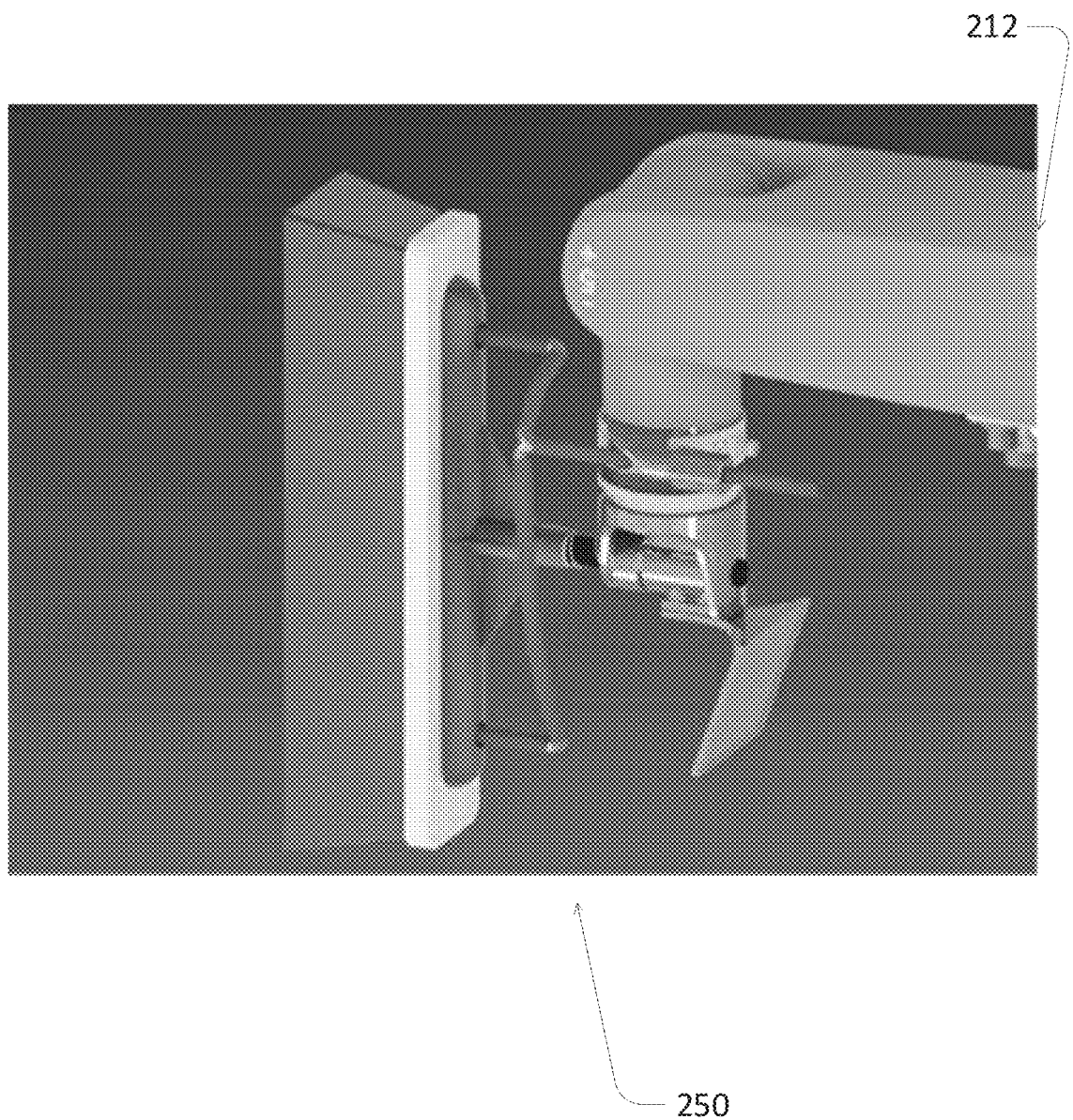
FIG. 2C is perspective view of the cleaning tool assembly mounted on a robotic arm used in some embodiments of the present invention.

An exemplary embodiment of a cleaning tool assembly that is in some embodiments included at the distal end of the robotic arm is illustrated in FIG. 2B on its own and in FIG. 2C at a distal end of the robotic arm. The cleaning tool assembly 250 has a replaceable brush 252 mounted having a distal side 254 for contacting the facade. The brush 252 is held by a brush holder 255 that extends distally from a cleaning tool assembly mount 260. The cleaning tool assembly 250 also includes, e.g. in the brush holder 255, a force sensor 256 which measures contact force of the brush (or other cleaning tool) 252 against the facade, e.g. based on a measured displacement of the brush 252 with respect to brush holder 255 (or cleaning tool assembly mount 260). The displacement is related to the force in a known relationship because of known properties of a spring 258 that opposes compression of the brush 252 against the brush holder 255. In other embodiments, in addition or instead of measuring force based on a linear displacement, one or more torque sensors in respective joints of the robotic arm are used to measure torque, and Jacobean (inverse kinematics) is used to calculate the required torque in each joint of the arm for a required tool contact force. Regardless of the type of force sensor, the robotic arm instructions are adapted for closed loop control of the contact force.

The cleaning tool assembly 250 has a receptacle 262 with a cylindrical bore that receives the water pipe 113 from the reverse osmosis system 109. The pipe is split by a t-shaped fitting 264 into a plurality of branches 266 that feed to the tool/brush 252 via holes in the proximal side of the tool/brush 252.

The robotic arm in the illustrated embodiment has six degrees of freedom, but in other embodiments a robotic arm with fewer or more degrees of freedom may be used. The crane, in any case, provides at least one degree of freedom (elevation), which may in some cases by supplement an elevation movement of the robotic arm 210.

Figure 3A:
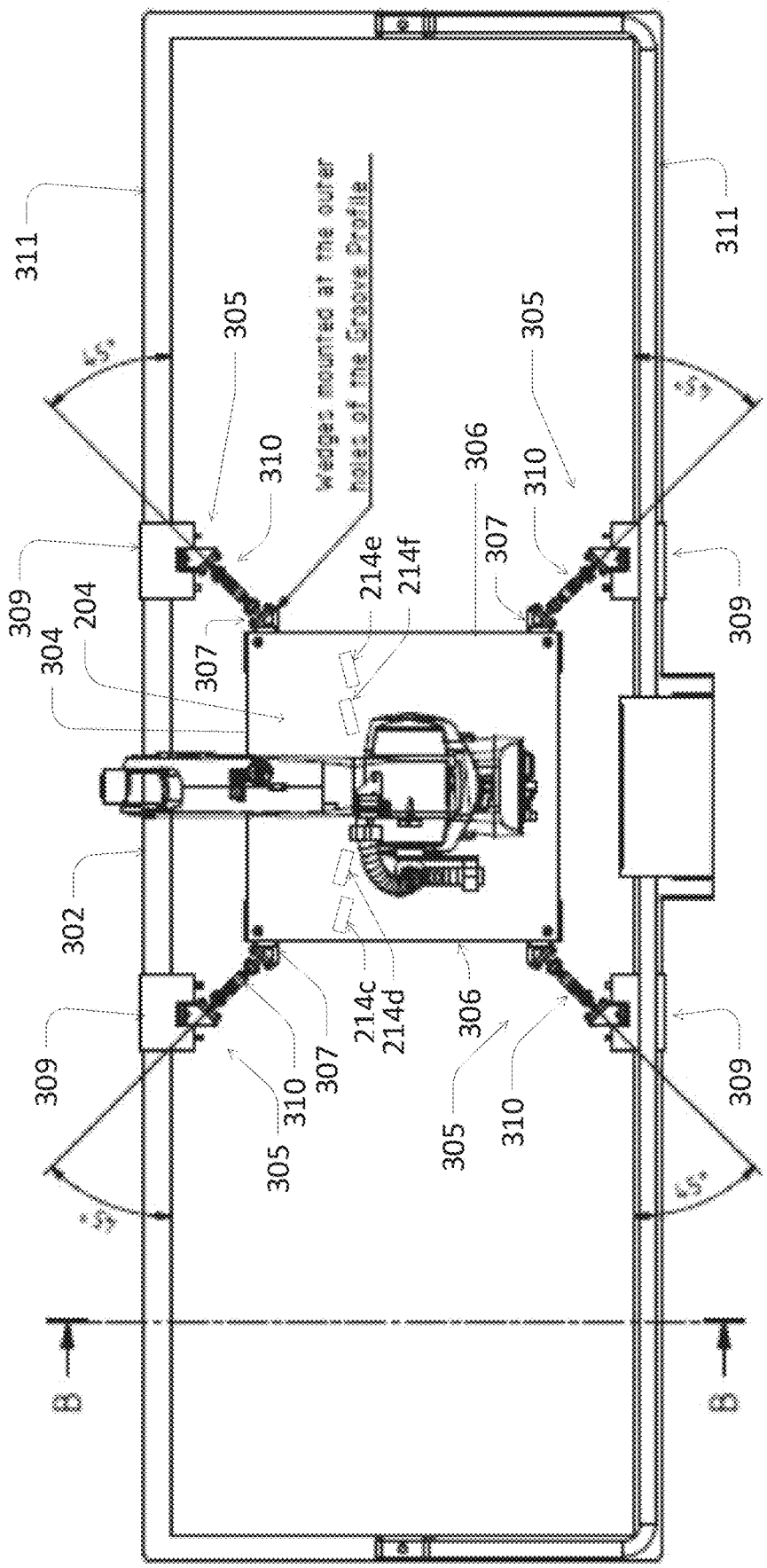
FIG. 3A is a plan view of a building maintenance elevator frame having a robotic arm on a mounting structure in a first configuration, in accordance with one or more aspects of the present invention.
Figure 3B:
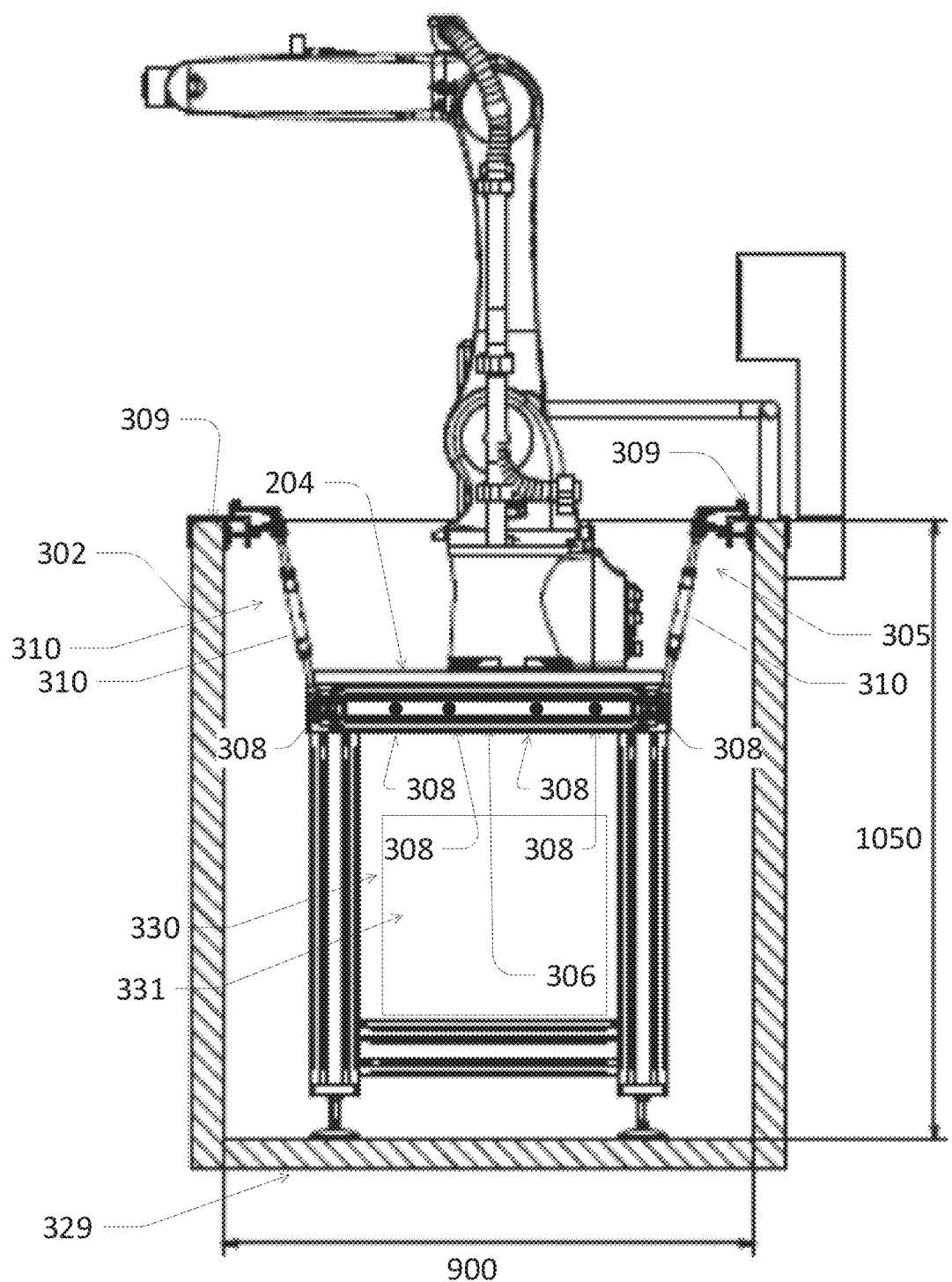
FIG. 3B is a side view of the building maintenance elevator of FIG. 3A.

The mounting structure 204 is illustrated in greater detail in FIGS. 3A-3D. FIG. 3A shows the mounting structure 204 in a plan view of a building maintenance elevator frame 302, which may be the same as the frame 202 of FIG. 2A. The building maintenance frame 302 has an elevator platform 329 at is base which in the illustrated embodiment forms a closed surface that holds the robot 206 via the mounting structure 204. In other embodiments the base of the frame 302 is not a closed surface and the platform that holds the robot is an open frame. The mounting structure 204 is in a first configuration for fitting to an elevator. The mounting structure is comprised of a mounting frame 304, in the form or a table having side rails 306 on each of its lateral sides. FIG. 3B shows the mounting structure of FIG. 3A in a side view. As can be seen in FIG. 3B, the frame 304 has an opening 330, and in some embodiments the opening holds a controller comprised of processing component 331 in a water resistant housing. The processing component optionally may be integrally a part of the processing component 213, or may be incorporated as a retrofitted add-on into processing component 213. In some embodiments includes the controller held in the opening 330 includes or consists of the control device 220.

The processing component 331 housed in the frame 304 may for example be a desktop or other computer, and in some embodiments communicates with the robotic arm via an Ethernet port on the robotic arm. The inclusion of a processing component in the frame 304, beneath the robotic arm, can advantageously lower the center of mass of the elevator basket, but without thereby improving stability. In some embodiments, although the center of mass is lowered, there is no increase the weight of the system, so the basket can be more readily maintained within the scaffolding weight limit.

The side rail 306 has a plurality of holes 308 longitudinally spaced along the rail 306. The mounting structure includes four size-adjustable clamping assemblies 305 that clamp the table 304 at a selected position in the elevator frame 302. Each clamping assembly 305 includes an inner wedge-shaped bracket 307 (FIG. 3A) that can slide along the rail 306 and be fixed to a selected on one of the holes 308. In the case of the elevator frame 302, being the widest frame to which the mounting structure 204 can mount, the inner brackets 307 are fixed to the outer-most holes in the rail 306. The clamping assembly 305 also includes outer bracket assemblies 309 clamped to an elongate frame member 311 along the length of the elevator frame 302. Each clamping assembly 305 is length adjustable by a jack 310 between the inner bracket 307 an outer bracket 309 of the clamping assembly 305. The outer brackets 309 are positioned along the elongate frame member 311 such that a longitudinal axis of their respective jacks 310 is on a 45 degree angle with respect to the elongate member 311, when viewed in plan. The adjustable length provided by the jacks 310 assist in the mounting structure 204 to be mounting to elevator frames of different heights. For example the jacks can be lengthened or shortened to accommodate elevator frames 302 in which the longitudinal frame member 311 is higher or lower than the relative height shown in FIG. 3B. The length adjustability of the jacks also assists in the ability of the mounting structure 204 to be mounting to elevator frames of different widths.

Figure 3C:
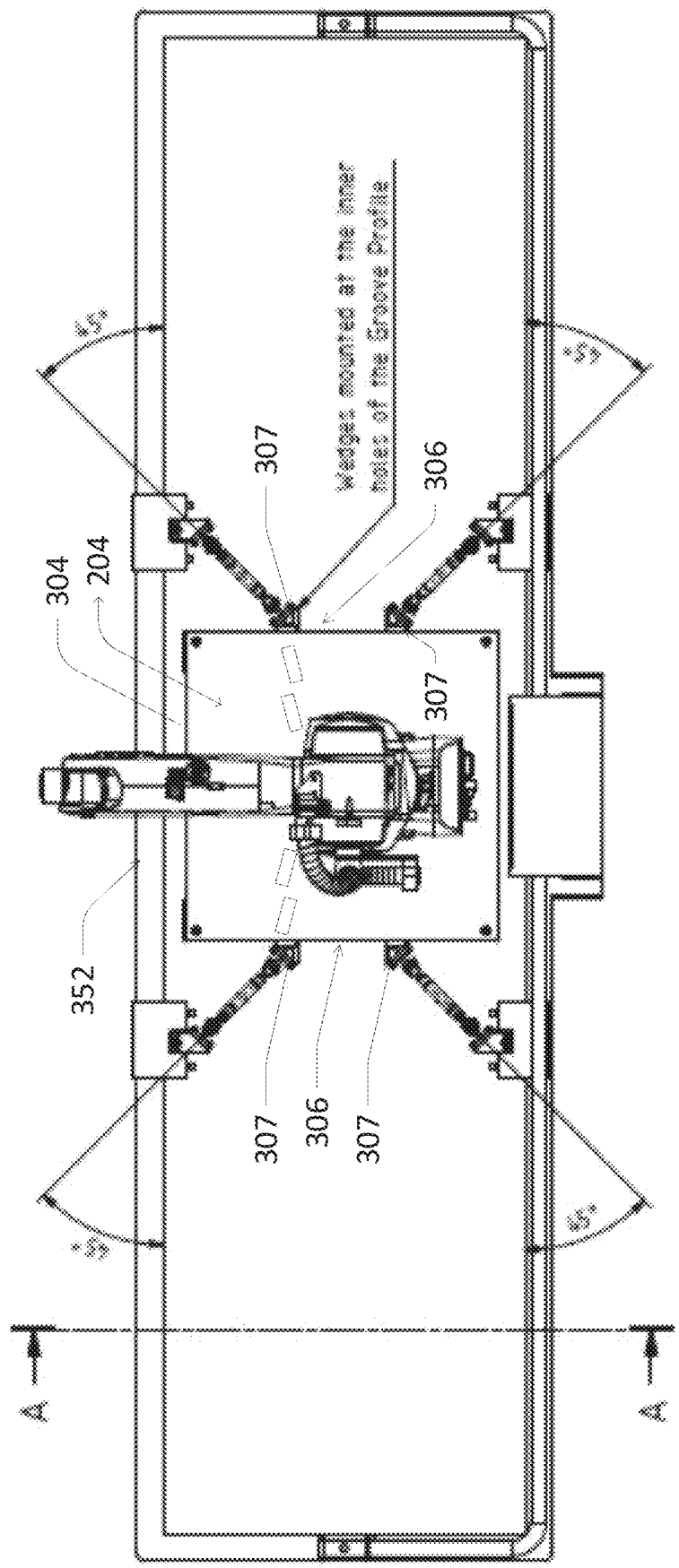
FIG. 3C is a plan view of another building maintenance elevator frame having the robotic arm on the mounting structure of FIGS. 3A and 3B in a second configuration, in accordance with one or more aspects of the present invention.
Figure 3D:
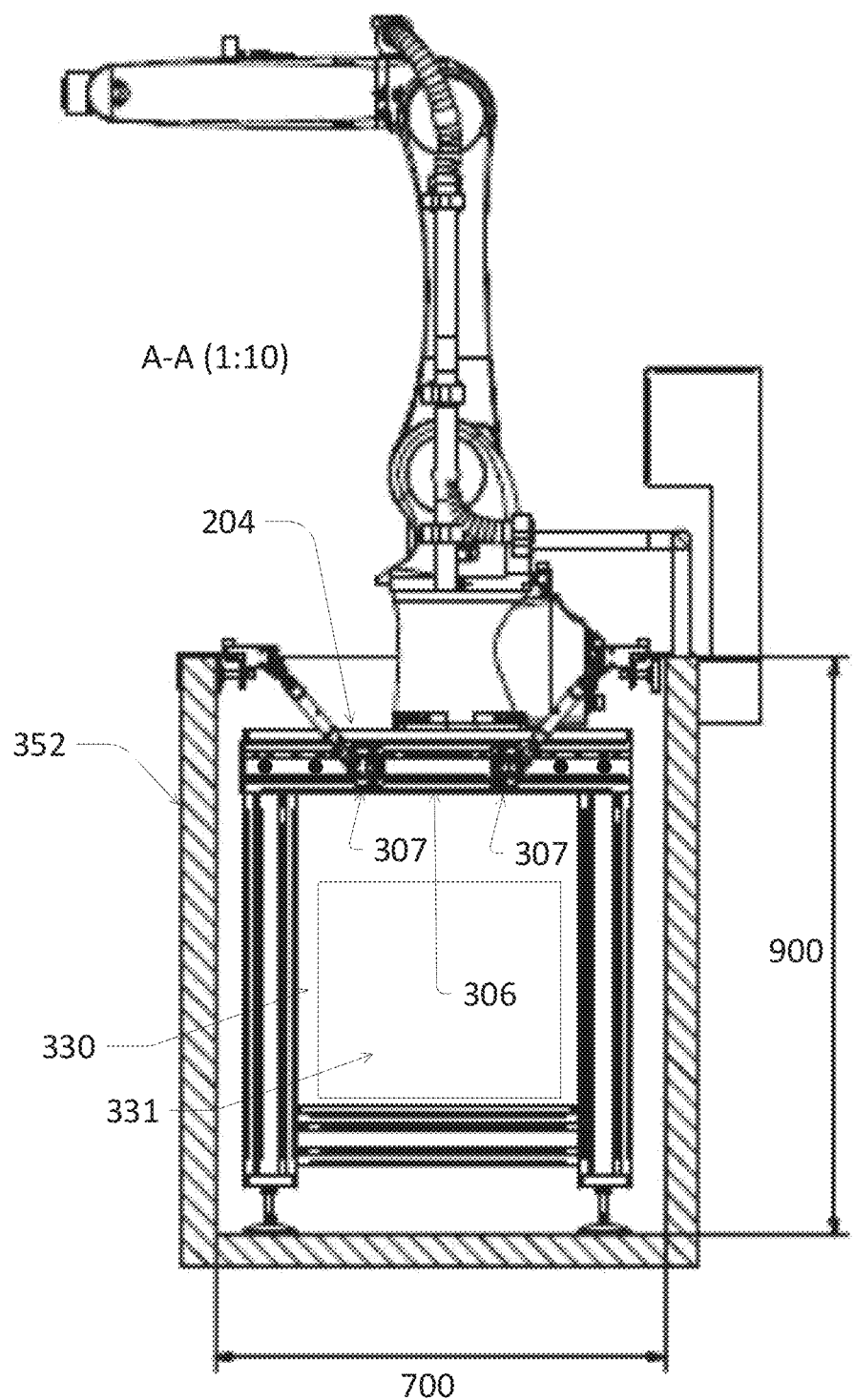
FIG. 3D is a side view of the building maintenance elevator of FIG. 3C.

Thus, the clamping assemblies 305 in conjunction with the plurality of inner mounting locations (in the form of holes 308) enable the mounting structure to be fitted to a wide variety of the basket sizes. For example, FIGS. 3C and 3D show a plan view and a side view, respectively, of another building maintenance elevator frame 352 which is narrower than frame 302. The frame 352 is the minimally sized (in terms of width) for fitting the robot 206 on the frame, via the same mounting structure 204 of FIGS. 2A, 3A and 3B. However, to fit the mounting structure 204 in this narrower frame 352 the inner brackets 307 of the respective clamping assemblies are fitted to the inner most holes of the rail 306.

By including a plurality of mounting structures 204 along the length of the elevator frame 302 or 352, a plurality of corresponding robots 206 can be mounted. Alternatively a single mounting structure can be used, with a table, like table 304, but extending along the length of the elevator frame so that multiple robots 206 can be mounted at different longitudinal position along the table. Returning to FIG. 2A, the robot 206 includes a control system, in the base 208 and/or the robotic arm 210, but in some embodiments at least within the base 208, for controlling movement of the distal end 212 of the robotic arm 210 with respect to the base 208. The control system of the robot 206 has processing system (also referred to herein as a processing component) 213 that has (a) an electromechanical interface for communicating within the robot to actuate movement of the robotic arm and (b) an external interface for communicating with an external device.

A device in accordance with some embodiments of one or more aspects of the invention may be or include the processing system/component 213 of the control system, configured to communicate with the electromechanical interface to drive movement of the robotic arm 210, and to use the second interface to receive sensor data from a plurality of surveying devices 214(a, b) that are mounted on spaced supports 216. In the illustrated embodiment there are two surveying devices, but in other embodiments there are more surveying devices, positioned at other spaced locations. A device in accordance with some other embodiments of one or more aspects of the invention may be, or may part of, a control device 220 that is external to the robot 206. For example, it may be a processing component 221, such as a processing system, of the control device 220. The processing component 221 may in such embodiments interface with the surveying devices 214 to receive their sensor data and may also interface with the robot 206 via the second interface to the control system of the robot 206.

In any case, the processing component 213 or 221 (but for ease of reference will hereinafter be referred to as just as component 221) may have therein or communicate with a non-transient memory 223 to read and perform a series of instructions to execute one or more aspects of the present invention. The processing component 221 receives the sensor data from the surveying devices 214 in some embodiments derives a 3D map of portion of the facade measured by the surveying devices 206, stores it to a memory. Subsequently the processing component 221 reads the 3D map from memory and a representation of a current position of the tool at the distal end of the robotic arm, and the processing component 221 derives therefrom an ordered sequence of instructions for the robotic arm to execute a cleaning pattern covering at least part (e.g. at least 50%) of the adjacent facade 104a corresponding to one or more regions of the facade 104a at which windows are located, and omitting one or more region of the facade 104a at which windows are not located. The processing component forwards a robotic arm component of the instructions via a first interface (e.g. via the electromechanical in the case of processing component 213, or via external interface in the case of processing component 221) to control the one robotic arm of the robotic system. Via a second interface, the processing component also wirelessly forwards, to the control system 107 at or in the crane 106, a building maintenance elevator component of the instructions to control the elevation of the building maintenance elevator. Communication to/from the processing component 221 via the first and second interface may be either, direct or via one or more intermediate interfaces. For example, there is a wireless link, via a 4G router, between the processing device 221 and the first interface and/or between the processing device 221 and the second interface.

In some embodiments, the sensor data is used to dynamically derive the 3D map to thereby represent a current configuration of the facade. In some cases, to keep the 3D map current, at least part of the 3D map is measured and derived during a time period in which there is also determined an ordered sequence of instructions, comprising robotic arm instructions for controlling at least one robotic arm of the robotic system, and building maintenance elevator instructions for controlling the elevation of the building maintenance elevator. In some embodiments the dynamically derived 3D map is an update to a previously captured 3D map. In any case a/the previously captured 3D maps is used to determine where the cleaning tool of the robot is located (i.e. the localization component of the SLAM). The position (location and orientation) of the elevator basket is in some embodiments also determined from the SLAM. For example, are the positions of the 3D sensors stored with respect to both (i) the geometry and mounting positions on the basket and (ii) with respect to the marker on the robotic arm, thus enabling both the arm and elevator positions to be mapped. Considered with regards to another frame of reference (the camera(s)), the location of each camera is determined (by SLAM) relative to the building. From this location, the position of the base of the robot is determined. Using the known position of the arm's tool relative to its base, the tool's position is derived relative to the building. This is achieved using a transformation matrix $H_{01}$, where $p1=H_{01}*p0$, where p0 is a vector in coordinate system of the camera and p1 is a vector in the coordinate system of the robotic arm. Using the newly identified location of the tool, the robotic arm instructions and and/or the building maintenance instructions are re-calculated to update the movement of the robotic arm and hence the path of the cleaning tool.

As discussed above, the 3D map is derived using SLAM. However, the term SLAM is used herein as a general sense to refer to a method that involves a localization component and a mapping component, rather than any particular form of localization and mapping, simultaneous or otherwise, that may be associated with the term SLAM. In the exemplary embodiments described herein localization is performed by visual odometry and mapping is performed by 3D point cloud stitching and processing. In other embodiments other techniques of mapping of mapping may be used. The SLAM is derived from sensor data derived from one, but in some embodiments a plurality of sensor systems, eg camera or lidar systems, supported on the building maintenance elevator. In the case of a plurality of sensor systems, sensor data may be correlated from a respective sensors plurality of cameras. Further, in the case of the sensors being camera sensors the sensors are in some cases in one or more stereo cameras so that each camera provides a 3D measurement. Thus a plurality of 3D measurements may be recorded from different perspectives. Alternatively, multiple 3D measurements from different perspectives may derived by having three or more separated mono (as opposed to stereo) cameras, whereby different pairs of mono cameras can be combined to derive a corresponding 3D measurement. In other embodiments the plurality of 3D perspectives is obtained from one or more mono cameras, each mono camera being used to derive the 3D measurements by using mono-SLAM, whereby a single camera is moved to different locations to capture images from different perspectives from which 3D data can be derived. The mono or stereo camera(s) may, conveniently, be provided by mono/stereo camera(s) in a smart phone or other portable consumer computing device. In FIG. 2A, the cameras 214$a,b$ are positioned on outer corners of the elevator basket, as shown in FIG. 2A. However, in other embodiments, such as illustrated in FIG. 3A, cameras 214(c-f) are additionally or alternatively mounted on the mounting structure 204 to be adjacent the robotic arm 210. In the embodiment of FIG. 3A, a first camera 214c and second camera 214d are positioned laterally to one side of the arm 210, and a third camera 214e and a fourth camera 214f are positioned laterally to the opposite side of the arm 210. Each camera 214(c-f) is orientated so that its field of view includes, amongst other things, the cleaning tool assembly 250 during in its calibration position and, in some embodiments, in all positions that the cleaning tool assembly can reach.

In any either the mono or stereo SLAM case, for embodiments in which a plurality of sensors are used, the sensors are pre-calibrated for consistency with each other. Thus is achieved by taking into account a transformation between the different perspectives of the different sensors. To calibrate to the sensors, a transformation matrix Hxy is used to transform a coordinate from perspective x to perspective y. For example, if p1 is a 3D point in the frame axis of sensor 1, then p2, which is p1 translated to in the coordinate frame of camera 2, is p2=H12*p1.

Each of the different 3D perspectives are combined to provides a 3D point cloud of the facade 104a, the point cloud comprising x, y and z coordinates (or some other 3D coordinate measurement) and a pixel color (e.g. as a set of Red, Green, Blue values). When combining the point clouds, the pre-calibrated transformations between each sensor/camera are then used to eliminate sensor dependent variations. The calibration may use a known algorithm, which can use OpenCV. OpenCV is also used to calibrate distortion of the lenses to the respective sensors (e.g. to remove fisheye distortion from lens).

Before combining the point clouds, each point cloud is processed to reduce error. For example, in some embodiments, each camera produces a point cloud. The x, y, z points derived from a given 3D sensor that do not correlate with all, or at least a majority, of the other x, y, z points from the same 3D sensors are filtered out. This is achieved by statistical analysis.

In some embodiments, Principle Component Analysis (PCA), or another statistical method, is used on parts of each point cloud to reduce a dimension (from a 3D surface to 2D plane) of point cloud from that camera. Once reduced from 3D to 2D data, the Euclidean distance is calculated between each point and the identified 2D plane. If the distance (i.e. deviation) is larger than a predefined threshold (10 mm, in some embodiments) then the point is dropped. Applying PCA to all of a given point cloud would produce only a single plane for that point cloud. Therefore, to maintain a 3D aspect to the cloud while nonetheless reducing data the PCA is instead performed on separately on different parts (i.e. subsets) of each cloud. This results in a plurality of 2D patches that collectively of define the mapped building surface defined by the reduced point cloud.

In other embodiments, if the color of the given x,y,z point is significantly different from the other color of points from the same point could, the point is dropped. Thus, reflections from the sun may produce a saturated pixel (a very white pixel) and if this does not occur for other pixels in the proximity, then the point corresponding to the saturated pixel is dropped. For example, a Euclidean distance of the RGB values may be recorded whereby the point is dropped if it deviates more than 50 measurement units from the proximate points that are k-nearest neighbors (kNN), e.g. within 20 mm Euclidian distance from such proximate points.

By any or all of the techniques described above, false measurements arising from reflecting surfaces or semi-transparent surfaces are dropped as noise, providing clearer and noise reduced 3D SLAM. At the final stage the Point Clouds that are not filtered out are combined to form one point cloud surface that is reduced in dimensions and computational cost by further processing. Such processing may, for example, be by a statistical analysis, such as using k-nearest neighbors (kNN) to detect point that are close to each other and connect them into vertexes as an example and from those to build a 3D mesh. When combining the points, however, a given point from one point cloud that does not correlate with corresponding points from all, or at least a majority, of the other point clouds, are filtered out. This further accounts for reflections and inaccuracies. Thus by using multiple cameras in multiple orientations such reflections and inaccuracies may be accounted for, as noise, and filtered out.

SLAM (mono or stereo) is used not only to dynamically derive an updated map of the facade, but also to calibrate the initial tool location, i.e. the localization component of SLAM. This is achieved using a marker 280 (FIG. 2B), for example a black and white image, e.g. a black "X" on a white background, that is included on a plate 280 on the cleaning tool assembly 250. The marker may be any visual and/or structural feature that is identifiable, by software, from the sensor data. The processing system identifies the location of the marker using each camera. Using the camera measurement, the known position of the marker on the arm's tool and the Inverse Kinematics of the robot, a transformation matrix from each camera to the base of the robot is determined by the processing system. As in the case of the mapping process described above, for some embodiments, the transform matrix is used to ensure consistency of measurements from different sensors/cameras to the robot marker. In some embodiments, after calibration, during execution of the cleaning pattern, the marker on the robot is not used to track movement after calibration. Rather, the position of the joints in the robotic arm is always known and the tool position is derived using forward kinematics, e.g. $X=(Q)J*Q$ where X is the Cartesian vector, J the Jacobean for the joint angles Q.

The transformation matrices (both for the sensors to each other; and from the sensors to the marker) may be determined by measuring multiple samples of p1 and p2 (as an example) and then finding $H_{12}=p2/p1$ with statistical analysis. The transformation matrices may be derived using any one of plurality of known techniques, for example as kNN, mean least squares method, or machine learning.

Figure 4:
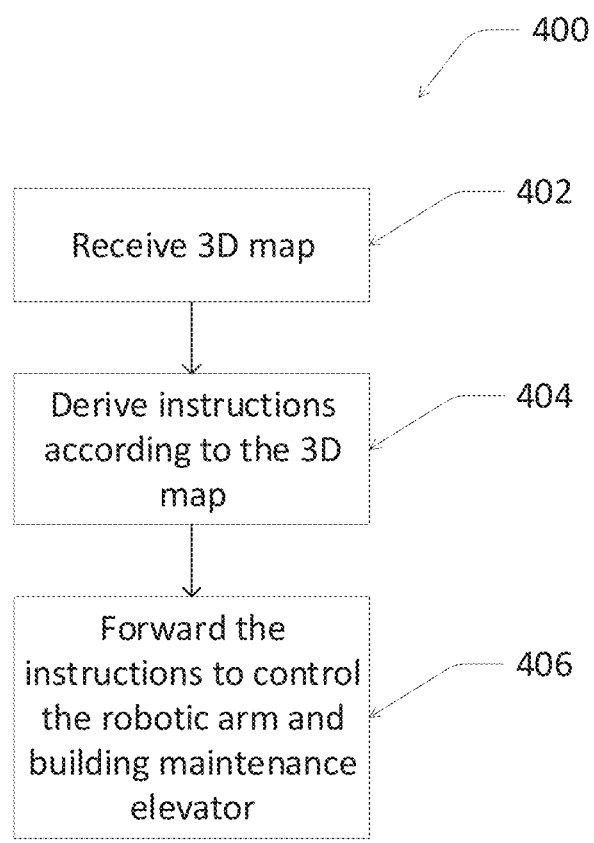
FIG. 4 is a flow diagram depicting an exemplary method in accordance with one or more aspects of the present invention.

An exemplary operation of the processing component 213/221 will now be described with reference to a method 400, illustrated as a flow diagram, in FIG. 4. For ease of description, the method will be described as being implemented on processing component 221, but is readily adaptable to be implemented on processing component 213. Alternatively, the implementation of the method 400 may be distributed between these or other processing components. Firstly, at step 402 processing component 221 receives the multi-dimensional map of at least a portion of at least one facade of a building.

At step 404, the processing component 221 determines, according to the map, an ordered sequence of instructions comprising the robotic arm instructions and the building maintenance elevator instructions. The robotic arm instructions and the building maintenance elevator instructions are temporally intertwined to execute a cleaning pattern covering at least part of facade 104a, and optionally a further facade, such a facade 104b. Then at step 306, which can at least in part happen during step 404, the processing component 221 forwards the robotic arm instructions to processing component 213 to control the robotic arm of the robotic system, and forwards the building maintenance elevator instructions to control system 107 to control the elevation of the building maintenance elevator, and thereby execute the 3D pattern.

An exemplary implementation of method 400 will now be described. Once generated the 3D map is stored in memory in communication with or integrated into processing component 221 (or 213). The processing component then derives a cleaning pattern, which may be a series of periodic or non-periodic cleaning vectors. Each cleaning vector has a complementary shape and orientation to the shape and orientation of the 3D map. In some embodiments the cleaning vector is a 2D predefined path, such as a zigzag or sinusoidal path or a series of arcuate hand-cleaning gesture-like movements, and the predefined path is oriented to fit a 2D surface in the 3D map, the 2D surface representing a flat window, for example. The pre-defined cleaning vector is normal to the surface of the facade.

In some embodiments (not shown) the robotic system includes a plurality of robotic arms, each of which may have the features of the robotic arm 206 of FIG. 2A. The 3D map is partitioned into different segments, each segment being allocated for cleaning by a respective robotic arm. The robotic arms may thus operate temporally in parallel (i.e. simultaneously) so that the facade can be cleaned more quickly.

For the/each robotic arm, a tool movement vector is derived based on the known position (location, orientation) of the cleaning tool at the distal end 212 of the robotic arm. The position is derived using the SLAM and forward kinematic methods described above, as once the position of the base of the robot is known all the other connected positions, such as that of the tool, the robot links and the scaffolding platform/elevator frame/basket can be derived therefrom From the known position of the tool, and in some cases taking into account a known shape of the tool, a robotic arm and/or building maintenance instructions are derived to implement the tool movement vector.

More specifically, the movement vector is derived based on known the position of the base and the robotic arm, the kinematics of each robotic arm/manipulator and their reach-ability (i.e. the cleaning area each arm can reach when its base is in a given position). Further, the tool movement vector is dynamically derived to match the cleaning vector to thus position the tool against the facade. Since the tool may in used be pushed away from following the cleaning vector, e.g. due to reaction forces and/or wind, the processing component 213 dynamically adjusts the movement vector so that it tracks the cleaning vector by closed loop control. In other words, on a cleaning vector, acting as Cartesian waypoints for the tool of the robotic arm, is firstly calculated from the map, and then passed to a path planning algorithm that is recalculating in real time to produce the tool movement vector. The closed loop control makes sure that the tool path is updated in case that the elevator and/or arm is moved uncontrollably. Since control of the basket is separated from the control of the arm, the arm detects that the basket's height, for example, is reduced, and corrects the path to maintain the same cleaning line/height.

In some embodiments, cleaning vectors are calculated from the offline pre-determined map and the tool path (movement vector) is corrected by the current position relative to that map. A movement path of the elevator is also calculated from the 3D map for time optimization, and used to control movement of the elevator frame. For example, in some embodiments, the path of the elevator (more particular the steps to the side) is optimized for the fastest/faster cleaning path. The optimization may, for example, define how much to move the basket to the left the next time the basket is moved down. This can be important in cases where the windows are not distributed evenly on the building. For example, the most appropriate distance to move can to next window may vary from window to window. Some windows may benefit, for example, a movement to the left of 1.2 meters, while others may benefit by 1 meter movement. The amount of movement is determined so as to maximize the amount of window area within the reachable workspace of the robotic arm for a given location of the basket. In another example, the arm's right-left movement covers two proximate windows, i.e. it skips between windows. However, in some cases this is not the most efficient way to clean the windows, so it can add to overall cleaning time. Thus, in some embodiments, such window-skipping is reduced if the skipping would take more than a predefined amount of time. From parameters that define the cleaning pattern and the positions of the windows, an optimal path of the crane is determined to minimize the total time to clean the facade (or a designated portion thereof).

After execution of the movement vector according to the cleaning vector the control system 221 continues the cleaning pattern by instructing the control system 107 at the crane to change the elevation of the elevator 200 to a next part of the facade 104 to be cleaned, adjacent the part of the facade 104 that has just been cleaned. The next part to be cleaned may be determined by feature analysis of the 3D map to identify, for example, another part of a window or a location of a next window.

In other embodiments the parts of the facade to be cleaned can be selected by an operator that marks the surfaced needing to be cleaned, via a graphical user interface that presents the 3D map to the operator. The graphical user interface may be included on the device 220 or on a remote device, such as a smart phone, tablet, laptop or the like, that is in communication with the device processing component 221 of the device 220. In some embodiment, the operator is presented with the 3D map on the operator's tablet and marks or verify on the tablet screen, and over the map, any identified windows that are real and can unmark/verify those any software-identified windows that are not real or which should not be cleaned. The operator has both the 3D model of the scan surfaces and 2D regular images from the cameras. The operator in some embodiments marks, on either the 2D or the 3D visualization, the location of the windows, e.g. by marking opposing corners of a window/windowed section of the facade (such as a left top edge and right bottom edge of the window/windowed section). In some embodiments, statistical analysis is used by software to automatically identify windows that have been marked with a similar marking to the marking on an initial window. In other embodiments, rather than relying on markings, or only on markings, machine learning is used to find the windows.

In embodiments employing feature analysis to automatically detect the windows, the operator need only verify or edit the window marking before execution. Moreover, the operator can optionally choose from different pre-recorded cleaning operations by demand. At the new elevation of the elevator 200, the position of the cleaning tool is recalculated and a next cleaning vector for the new location is determined in the same manner as described above. The next cleaning vector may have the same or a different shape or relative path of the previous cleaning vector, thus a pattern formed by successive cleaning vectors may be periodic or non-periodic. In other embodiments, movement of the elevator 200 can form part of the implementation of the movement vector, as opposed to being implemented only by movement of the robotic arm, alone. Thus the sequence of instructions from the processing component 221 are temporally intertwined to either alternatingly or simultaneously move the robotic arm and elevator to execute the cleaning pattern.

In other embodiments, more than one, or even all, of the cleaning vectors for the facade are firstly determined before any cleaning operations are performed. The robotic arm and elevator paths are then planned from beginning to end, before finally executing the planned paths under closed loop control to ensure they track the cleaning vectors. By determining a plurality of cleaning vectors before commencing cleaning, a path for the elevator can be planned to optimize efficiency of executing the plurality of cleaning vectors as a whole. For example for efficiency, the elevator frame may be moved to take into account the cleaning vectors and/or the positions on the facade at which they are to be executed. For example if each of the cleaning vectors moves from left to right, then the elevator path can be planned to move from left to right, rather than right to left. In another example, if the whole basket moves to the left then all of the plan is updated to account for that movement and avoid collision with the edges of the window.

In embodiments described hereinbefore the multi-dimensional map is generally referred to as a three dimensional (3D) map. However in some embodiments a two dimensional map may instead be used for the multi-dimensional map. For example this may be the case for buildings in which window spacings and positions are repetitive. One can in such case, "record" the path for a general window, use image processing in two dimensions to determine the relative position to that window and, according to that, correct the recorded path. Once the window is cleaned, the elevator basket is lowered after a specific time interval to get the next window and so on.

In the illustrated embodiments the elevator platform is or is included in a portion of a building maintenance elevator system operated via a crane. However, in other embodiments, the position of the elevator platform may be controlled by other forms of elevator systems. For example in some embodiments, the elevator system may be a genie lift, which is a lift having a mobile support structure that stands on the ground and uses a pneumatic arm that can extend upward to lift the elevator platform, or retract downward to lower the platform, into the required platform position.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. To the extent that section headings are used, they should not be construed as necessarily limiting.

In addition, any priority document(s) of this application is/are hereby incorporated herein by reference in its/their entirety.

What is claimed is:

1. A computer implemented method for controlling a cleaning process of one or more building facades from an building maintenance elevator of a building, comprising:
   receiving a multi-dimensional map of at least a portion of at least one facade of the building;
   determining, according to the multi-dimensional map, an ordered sequence of instructions, comprising:
      robotic arm instructions for controlling at least one robotic arm of a robotic system mounted on a basket of an elevator platform of the building, and
      elevator platform instructions for controlling a position of the basket;
   wherein said robotic arm instructions and said elevator platform instructions are temporally intertwined to execute a cleaning pattern covering at least part of the at least one facade along a plurality of different floors;
   forwarding said robotic arm instructions to the robotic system for controlling the at least one robotic arm of the robotic system via at least one first interface; and
   forwarding said elevator platform instructions to a building maintenance elevator component for controlling the elevation of the basket via a second interface which is different from the at least one first interface;
   wherein said at least one first interface comprises a first electromechanical interface of a processing component comprised in a control system of the robotic system and adapted for communicating with the at least one robotic arm via said first electromechanical interface to drive movement of said at least one robotic arm,
   wherein the second interface is a communication interface comprised in a control system of the building maintenance elevator which is separate from the control system of the robotic system and adapted for communicating with a remote device to receive said elevator platform instructions, wherein the control system of the building maintenance elevator comprises an output to a second electromechanical interface that deives movement of the elevator platform.

2. The computer implemented method according to claim 1, wherein according to the cleaning pattern, a cleaning tool at a distal end of each of the at least one robotic arms follows a path that traces the cleaning pattern.

3. The computer implemented method according to claim 2, wherein determining the ordered sequence of instructions comprises calculating the robotic arm instructions based on the multi-dimensional map, a determined current position of the cleaning tool, and a determined elevation of the elevator platform.

4. The computer implemented method according to claim 1 wherein the method comprises:
   determining a path planned for the elevator platform based on a selection of surfaces to be cleaned, the path including at least one of: (a) one or more movements in elevation; and (b) one or more horizontal movements; and
   determining the elevator platform instructions based on said path,
   wherein the control system of the building maintenance elevator is integral to a crane, the control system of the building maintenance elevator determining the position of the elevator platform based on said elevator platform instructions.

5. The computer implemented method according to claim 1 wherein the method comprises updating the multi-dimensional map from correlated sensor data from a plurality of multi-dimensional measurements recorded from different perspectives.

6. The computer implemented method according to claim 1, wherein the method comprises using simultaneous localization and mapping to a) determine a position of the robotic arm and b) update the multi-dimensional map.

7. The computer implemented method according to claim 1, wherein the method comprises receiving a plurality of selections of respective portions of an image that corresponds to the at least one facade, and determining the ordered sequence of instructions based on said selections.

8. The computer implemented method according to claim 1, wherein the method further comprises generating instructions for operating a reverse osmosis cleaning system configured for cleaning the at least one facade at a distal end of the at least one robotic arm to execute the cleaning pattern thereby.

9. The computer implemented method according claim 1 wherein the multi-dimensional map is a three dimensional map.

10. The computer implemented method according to claim 1 wherein the method comprises measuring a contact force between the at least one robotic and the at least part of the at least one facade during execution of the cleaning pattern, wherein the robotic arm instructions are adapted for closed loop control of the contact force.

11. The computer implemented method according to claim 1, wherein the method comprises dynamically updating the multi-dimensional map to represent a current configuration of the facade, wherein updating the multi-dimensional map comprises using sensor data derived from at least one sensor supported on the elevator platform on at least one support spaced apart from said at least one robotic arm.

12. The computer implemented method according to claim 11, wherein the at least one sensor comprises at least one camera and wherein the method comprises performing mono simultaneous localization and mapping (mono-SLAM) for each of the at least one sensors.

13. The computer implemented method according to claim 1, wherein the method comprises dynamically deriving and adjusting a tool movement vector for a cleaning tool at a distal end of a respective one of the at least one robotic arm to track a cleaning vector defined according to the cleaning pattern by closed loop control, and correct the cleaning vector when at least one of said elevator platform and said respective one of the at least one robotic arm moves uncontrollably.

14. A system for controlling cleaning of a building facade from a basket of an elevator platform of a building, comprising:
   at least one processor configured to:
      receive a multi-dimensional map of at least a portion of at least one facade of the building;
      determine, according to the multi-dimensional map, an ordered sequence of instructions, comprising:
         robotic arm instructions for controlling at least one robotic arm of a robotic system mounted on a basket of the elevator platform, and
         elevator platform instructions for controlling a position of a basket;

wherein said robotic arm instructions and said elevator platform instructions are temporally intertwined to execute a cleaning pattern covering at least part of the at least one facade along a plurality of different floors;

forward said robotic arm instructions to the robotic system for controlling the robotic arm of the robotic system via a first interface; and forward said elevator platform instructions to a building maintenance elevator component for controlling the elevation of the basket via a second interface which is different from the first interface;

wherein said at least one first interface comprises a first electromechanical interface of a processing component comprised in a control system of the robotic system and adapted for communicating with the at least one robotic arm via said first electromechanical interface to drive movement of said at least one robotic arm, wherein the second interface is a communication interface comprised in a control system of the building maintenance elevator which is separate from the control system of the robotic system and adapted for communicating with a remote device to receive said elevator platform instructions, wherein the control system of the building maintenance elevator comprises an output to a second electromechanical interface that drives movement of the elevator platform.

15. A system according to claim 14, wherein the at least one robotic arm is a robotic arm manipulator of reverse osmosis cleaning system having a cleaning tool at a distal end of each of the at least robotic arm.

16. The system according to claim 14, wherein the at least one robotic arm comprises at least one force sensor configured for measuring a contact force between the at least one robotic arm and the at least part of the at least one facade during execution of the cleaning pattern, wherein the robotic arm instructions are adapted for closed loop control of the contact force.

17. The system according to claim 16, wherein the at least one force sensor comprises at least one of:
   a force sensor that measures force based on a displacement a cleaning tool with respect to a component on a distal end of a robotic arm of said at least one least robotic arms; and
   at least one torque sensor in a respective joint of a robotic arm of said at least one least robotic arms.

18. The system according to claim 14, wherein the system includes a mounting structure having a mounting frame, wherein each of the at least one robotic arm is mounted on the mounting frame and the mounting structure further includes a clamping assembly that extends, in an adjustable configuration, from the mounting frame to adjusts a position of the mounting frame on the elevator platform to fix the mounting frame within the elevator platform.

19. The system according to claim 18, wherein the clamping assembly has an adjustable length, wherein the clamping assembly mounts to an adjustable position on a rail of the mounting frame, and wherein the rail includes a plurality of mounting features at different lengths along the rail to provide said adjustable position.

20. A non-transient computer readable medium instructions for execution of a program for controlling cleaning of a building facade from an elevator platform of an elevator system, wherein execution of the instructions by at least one processor configures the processor to:
   receive a multi-dimensional map, generated from sensory data having at least three dimensions, of at least a portion of at least one facade of the building;
   determine, according to the multi-dimensional map, an ordered sequence of instructions, comprising:
      robotic arm instructions for controlling at least one robotic arm of a robotic system mounted on a basket of an elevator platform of the building, and
      elevator platform instructions for controlling a position of the basket;
   wherein said robotic arm instructions and said elevator platform instructions are temporally intertwined to execute a cleaning pattern covering at least part of the at least one facade along a plurality of different floors, thereby motions of the at least one robotic arm and basket according to said robotic arm instructions and said elevator platform instructions are simultaneous at least in part throughout time;
   forward said robotic arm instructions to the robotic system for controlling the at least one robotic arm of the robotic system via at least one first interface; and
   forward said elevator platform instructions to a building maintenance elevator component for controlling the elevation of the basket via a second interface which is different from the at least one first interface;
   wherein said at least one first interface comprises a first electromechanical interface of a processing component comprised in a control system of the robotic system and adapted for communicating with the at least one robotic arm via said first electromechanical interface to drive movement of said at least one robotic arm,
   wherein the second interface is a communication interface comprised in a control system of the building maintenance elevator which is separate from the control system of the robotic system and adapted for communicating with a remote device to receive said elevator platform instructions, wherein the control system of the building maintenance elevator comprises an output to a second electromechanical interface that drives movement of the elevator platform.

* * * * *